No. 711,685. Patented Oct. 21, 1902.
S. P. WATT.
DOOR CHECK.
(Application filed Aug. 27, 1901.)
(No Model.) 2 Sheets—Sheet 1.

Witnesses: Harold G. Barrett, d. T. Day.

Inventor: Sam P. Watt
By Rector & Hibben
His Attys

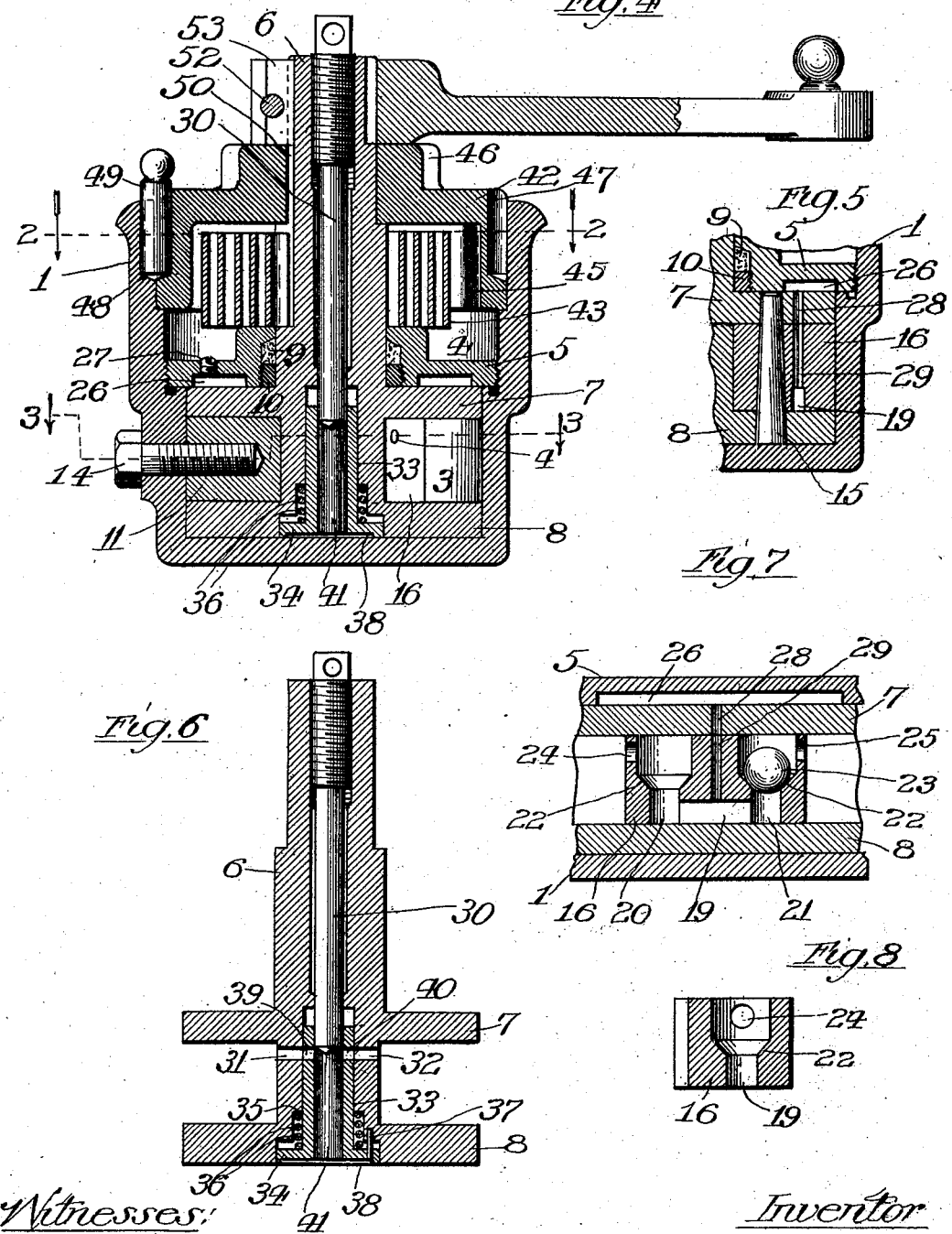

UNITED STATES PATENT OFFICE.

SERN P. WATT, OF MORGAN PARK, ILLINOIS, ASSIGNOR TO HINE-WATT MANUFACTURING COMPANY, OF CHICAGO, ILLINOIS, A CORPORATION OF ILLINOIS.

DOOR-CHECK.

SPECIFICATION forming part of Letters Patent No. 711,685, dated October 21, 1902.

Application filed August 27, 1901. Serial No. 73,475. (No model.)

*To all whom it may concern:*

Be it known that I, SERN P. WATT, residing at Morgan Park, Cook county, Illinois, have invented certain new and useful Improvements in Door-Checks, of which the following is a specification.

My invention relates to what are known as door-checks; and its object is to provide a simple, efficient, and reliable device of this character and one containing certain novel and useful features in construction and operation, as will be hereinafter made apparent.

Figure 1:
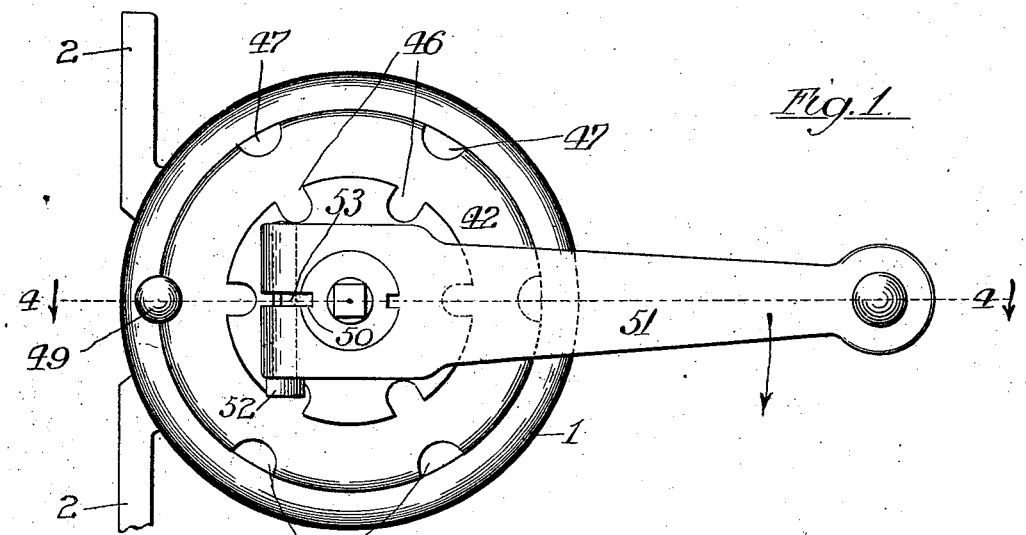
Figure 2:
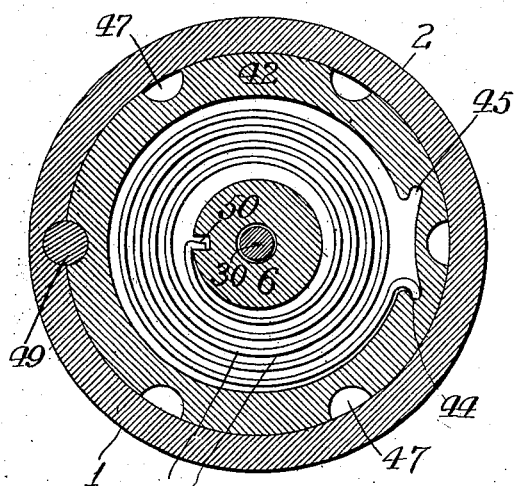
Figure 3:
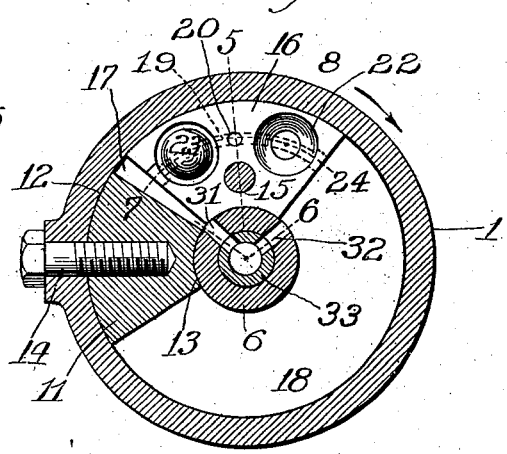

In the drawings, Figure 1 is a plan view of my door-check; Fig. 2, a section on the line 2 2 of Fig. 4; Fig. 3, a sectional plan on the line 3 3 of Fig. 4; Fig. 4, a section on the line 4 4 of Fig. 1; Fig. 5, a section on the line 5 of Fig. 3; Fig. 6, a section on the angular line 6 of Fig. 3; Fig. 7, a section on the curved line 7 7 of Fig. 3; Fig. 8, a section on the line 8 of Fig. 3, and Figs. 9 and 10 detail views of a modified form of construction as to certain of the parts.

My door-check, which may be made of any suitable material and of any suitable dimensions, comprises an outer casing 1, having lugs or flanges 2 for attachment to the door and having a pressure-chamber or "oil-pot" (so called because oil is a fluid quite commonly used) and a spring-chamber 4. The lower chamber is the pressure or fluid chamber, and the same is of slightly-reduced diameter as compared with the spring-chamber above. These chambers are separated by means of a cover 5, which screws into the lower portion of the spring-chamber, as clearly illustrated in Fig. 4.

The main operating shaft or trunnion 6 consists in its preferable form, as shown, of the shaft proper and the two parallel disks 7 and 8, which are of the same diameter as the oil-pot and so placed on the shaft as that the lower disk 8 bears on the bottom or floor of the oil-pot, while the upper disk 7 is adjacent to the cover 5, which may, however, be more or less removed from such disk 7. The shaft 6 passes through a central hole in said cover and is packed by means of the packing 9 and packing-nut 10, the opening through the cover being counterbored and screw-threaded to accommodate this packing and the nut, all as clearly illustrated in Fig. 4.

Within the fluid-chamber or oil-pot and between the disks is arranged a fixed abutment 11, which is substantially in the form of a segment, Fig. 3, with an outer arc or surface 12, described from the same center as the inner circumference of the fluid-chamber, and therefore fitting such circumference closely, and with an inner arc or surface 13, corresponding to the arc of the operating-shaft, in respect to which said fixed abutment has a piston-tight fit. This fixed abutment is held in place and tightly fastened by means of a cap-screw 14, passing through the side of the casing, Figs. 3 and 4. This fixed abutment is of such thickness as to have a piston-tight fit between the two disks 7 and 8.

Fastened between the disks by means of a taper pin 15, Fig. 5, or any other suitable or desirable manner is a movable abutment or piston 16, preferably of segmental form and similar in general outline to the fixed abutment. The movable piston divides that portion of the fluid-chamber or oil-pot exclusive of that filled by the fixed abutment into what may be termed a "low-pressure" chamber 17 and a "high-pressure" chamber 18, although normally the two chambers contain pressures of equal degree, and unequal degrees of pressure only in the operation of the device. It is to be understood that the character of the chamber changes when the direction of movement of the shaft is changed in order to adapt the device for right or left hand movement, the parts being now described and named for a left-hand-operating check. While it is preferable to so set the device as to always form these two chambers, as seen in Fig. 3, yet in normal condition the movable piston may be so set with respect to the disks with which it moves as to contact the fixed abutment.

The device is adapted to permit free movement in the opening of the door against the tension of a spring hereinafter described, and to this end the movable piston has a check-valved passage between the high and low pressure chambers, the particular check-valve herein shown being so constructed and arranged as to permit reversal in the direction of the checking, to the end that with slight changes in assembling the device may be adapted to work either right or left handed.

In the present instance the movable abutment or piston has on its under face a curved recess or passage 19, connecting at its ends two transverse passages 20 and 21, each enlarged at the ends opposite their communication with the passage 19 in order to form a valve-chamber and a valve-seat 22. A suitable check-valve is adapted to coöperate with one or the other of said seats, dependent upon whether the device is to work right or left handed, and in view of the desirable readiness of change it is preferred to use a ball 23, constituting a valve adapted to control either passage 20 or 21, according to which seat it coöperates with. The chamber 18 communicates with passage 20 by means of a side opening 24, while chamber 17 communicates with passage 21 through a similar side opening 25.

The cover 5 is provided on its under face with an annular recess 26, into which oil or other fluid is supplied through a small supply-port normally closed by a screw-plug 27, as shown in Fig. 4. The oil or other fluid is fed from this recess into the oil-pot or fluid-chamber through a transverse passage 28 in the upper disk 7 and through a passage 29, arranged transversely of the piston and communicating with the passage 19 therein. When the parts are in their normal position, as illustrated in Fig. 3, the port 28, which is always in communication with the annular recess, registers with the port 29. The construction and arrangement above described permits not only of the feeding of oil or other fluid to the fluid-chamber, but of the providing of an immediate supply automatically fed thereto, while at the same time takes care of any air that may have been trapped in such fluid-chamber, the fluid displacing the air, which thereupon enters recess 26. The screw-plug 27 permits ready access to the fluid-chamber for the purpose of supplying additional oil or other fluid, it being the intention to keep the annular recess 26 practically filled with fluid.

The check proper, which operates to control the movement of the piston and to restrict the action of the spring, comprises a regulated communication between the two chambers in the oil-pot, so as to permit equalization of pressure in said chambers. In the present instance a regulated valve 30 is employed, such valve being received by a longitudinal bore in the shaft or trunnion and screw-threaded near its top, so as to be adjusted up and down therein. This valve has a piston-tight fit at its lower end, so as to govern two radial passages 31 and 32, formed in said shaft or trunnion and extending into the oil-pot chambers. By screwing the valve inward—that is, downward, as shown in the drawings—the size of the opening or passage between said chambers is restricted, and by screwing up the valve such opening or passage is enlarged. Upon the adjustment of such valve, therefore, depends the rapidity of the closing of the door—that is, the rapidity of the equalization of pressures between the two chambers of the oil-pot.

The above-described construction would answer for the ordinary conditions; but extraordinary conditions sometimes arise, such as a heavy wind or the weight or pull of a person forcibly and suddenly against the door. To provide for such extraordinary conditions, I have devised means for automatically restricting the passage between the high and low pressure chambers, said means working independently of the set adjustment or regulating-valve. This automatic device in the present instance comprises a bushing 33, arranged in the enlarged lower end of the bore in the shaft or trunnion, which is counterbored to form a chamber receiving a disk or flange 34 on the lower end of the bushing, which flange constitutes a piston having a slight movement in such chamber, but sufficient for the purpose desired. The end of the shaft or trunnion has a second counterbore to form a shoulder 35, against which abuts a coiled spring 36, encircling the bushing and adapted to thrust the bushing downward in normal position upon the bottom of the oil-pot. To permit the longitudinal movement but prevent rotary movement of this bushing, a pin 37, fixed in the shaft or trunnion, passes through the piston 34, although any other obvious and desired means may be adopted for this purpose. The piston 34 is beaded at its circumference or otherwise formed, or rather undercut, so as to prevent the piston from seating flatly as to its entire extent, but to provide a chamber 38. Holes 39 and 40 are provided in the movable bushing, so as to be normally in full register with passages 31 and 32, respectively. The passage 41 through the bushing is of such size as to provide a piston-tight fit for the lower end of the regulating-valve. Any great pressure suddenly created from any of the causes above named or from any other cause or condition is communicated downwardly through the passage 41 of the bushing and to the chamber 38 and thence upwardly against the piston 34, which is forced upward against the tension of the spring 36, and against any air trapped above such piston, with the result that the bushing is also moved upwardly, thereby causing an automatic restriction of the flow of oil or other fluid through the passages 31 and 32 regardless of the particular set position of the regulating-valve.

An outer cover or spring-case 42 fits into and closes the spring-chamber 4 and has a central opening through which the operating shaft or trunnion passes. The case is adapted to rotate when desired within the outer casing and is provided on its inner circumference with means of attachment for the outer end of a suitable spring, such as the flat coiled spring 43. In the present instance these means consist of the two oppositely extending or directed recesses 44 and 45, the outer end of the spring being anchored in the recess 44 when the device works left-handed. When the device works right-handed, the spring is reversed and the outer end is secured in the other recess 45. This spring-case has on its hub a series of notches 46 to receive a spanner-wrench, so that the tension of the spring can be readily adjusted. To hold the spring-case in different adjusted positions, the margin thereof has a series of transverse semicircular grooves 47, any one of which when brought into register with a semicircular groove 48 on the inner face of the casing 1 forms therewith a vertical hole to receive a pin or key 49. The inner end of the spring is anchored in a longitudinal groove 50 on the outer surface of the operating shaft or trunnion.

The operating-lever 51 is secured to the operating-shaft by clamping it thereon by means of the screw 52 and by the employment of a key 53, entering a longitudinal groove in the upper end of said shaft and passing through the bifurcated end of said operating-lever, all as clearly shown in Figs. 1 and 4.

The operation of my door-check is as follows, assuming that it is working left-handed—that is, with the lever and piston moving in the direction of the arrows shown in Figs. 1 and 3: In normal condition before the door is opened and the check device thereby operated the pressure in the two chambers in the oil-pot is equal and continues practically so even after the full movement of the movable piston to the left as far as it is permitted to go. Then equalization of pressure in the two chambers is rendered possible during this movement of the piston by reason of the free passage afforded at this time between the two chambers and through the movable piston. When this piston thus moves, the oil or other fluid displaced from chamber 18 flows through the passages 24 20 19 21, passes the check-valve or ball, and thence through the passage 25 into the other chamber 17. The passage of the oil or other fluid is thus practically unimpeded. The passage of the oil in the contrary direction, however, is prevented by means of the check-valve, and the only communication between said two chambers is through the restricted passages 31 and 32, the chamber 17 being now a high-pressure chamber and the chamber 18 being a low-pressure chamber. When the door was opened, the spring was of course wound up and the tension considerably increased, and the restricted passage between the chambers now constitutes a check or retarding force against the action of the spring, this restriction being under the control of the regulating-valve 30. The movable abutment or piston can return to normal position and the door can close only so fast as the fluid displaced from chamber 17 is permitted to pass through the restricted passage. The piston is substantially segmental in form, and its sides are therefore formed on a radius of the fluid-chamber or oil-pot, so that the pressure which it exerts against the body of the oil or other fluid is always uniform and constant, which increases the proper and efficient operation of the door-check as a whole.

Figures 9, 10:
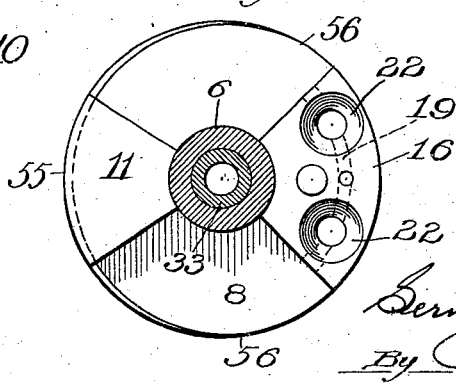

In Figs. 9 and 10 is illustrated a modified form of construction, in which one of the inner corners of one of the disks is beveled for a portion of its circumference, the amount of the bevel being greatest at the point 55 and decreasing gradually in opposite directions to the zero-point 56. The object of this construction is to permit a rapid initial movement in the closing of the door, which slows up gradually in speed toward the full closing thereof, the equalization between said chambers taking place through said opening formed by the bevel between one of the disks and the fixed abutment. This modified form of construction may be used separately or in conjunction with the regular valve 30. Furthermore, it is obvious that either one of the disks may be modified—that is, its corner beveled off—and the operation will be the same in both cases. In the present instance it is the upper corner of the lower disk 8 which is beveled off, as shown more clearly in Fig. 10; but it will be apparent that the lower corner of the upper disk 7 may be beveled off with the same results as to equalization of the two chambers.

When the shaft or trunnion is provided with the two disks, as herein shown and described, practically all end and side thrust of the operating parts is prevented, so that the door-check will operate smoothly and efficiently.

While oil has hereinbefore been spoken of as the resistance for my door, it will be understood that any other fluid may be employed, such as glycerin and like fluids or fluid mixtures, as are commonly used in devices of this character. Furthermore, while I prefer to locate the check-valved passage in the movable abutment the same might be located in the fixed abutment.

The herein-described construction of the actuating shaft or spindle 6 and its two parallel disks 7 and 8 is particularly advantageous in the consequent provision of an extended bearing to effectually resist both lateral and longitudinal strains or thrusts. As will be evident from Fig. 4 of the drawings, the shaft or spindle is not only well supported at the upper end, where it passes through the spring-case, but has the extended bearing equal to the full height of chamber 3. The lower disk 8 rests substantially flat upon the floor of such chamber and is of the same cross-sectional area, so that sockets and the like in such floor or bottom of the chamber which provide short and efficient bearings are avoided.

I claim—

1. A door-check comprising a fluid receptacle or chamber, a fixed abutment and a movable abutment in said chamber, one of said abutments having a single passage through it, a reversible check-valve device located in said passage whereby the direction of checking through such passage may be reversed, and means independent of said valve device for regulating equalization of pressure on both sides of the movable abutment.

2. A door-check comprising a fluid receptacle or chamber, a fixed abutment and a movable abutment in said chamber, one of said abutments having a single transverse passage provided with oppositely-arranged valve-seats, a check-valve comprising a single removable ball in said passage adapted to coöperate, at will, with one or the other valve-seat whereby the direction of check may be reversed, and means for regulating equalization of pressure on both sides of the movable abutment.

3. A door-check comprising a fluid-chamber, a fixed and a movable abutment therein, an operating shaft or spindle having parallel disks or flanges between which the movable abutment is secured, one of the abutments having two ball-chambers closed at the top by the upper disk and each provided with a valve-seat, said chambers being connected below their seats by a passage and a single ball adapted to be loosely placed in one or the other of the ball-chambers.

4. A door-check comprising a fluid receptacle or chamber, an operating-shaft therein, a fixed abutment in said receptacle, a movable abutment also located therein and operated by said shaft, said movable abutment having a passage 19 connected at its ends to two passages 20 and 21 which in turn communicate with said chamber through passages 24 and 25 respectively, each passage 20 and 21 having a valve-seat 22, and a ball-valve 23 adapted to coöperate with one or the other of said seats, means independent of said passages 20 and 21 for regulating equalization of pressures on opposite sides of said movable abutment, and a spring coöperating with said shaft.

5. A door-check comprising a fluid receptacle or chamber, a shaft or trunnion having two parallel disks operating in said chamber, a fixed abutment arranged in said chamber and between said disks, a movable abutment secured to said disks, means of communication between both sides of the movable abutment, means for regulating said communication, said movable abutment having a check-valved passage, and a spring coöperating with said shaft.

6. A door-check comprising a fluid receptacle or chamber, a shaft or trunnion having two parallel disks operating in said chamber and door-checking mechanism arranged between said disks.

7. A door-check comprising a fluid receptacle or chamber, a shaft or trunnion having two parallel disks operating in said chamber, a fixed abutment arranged between the disks and of a thickness equal to the distance between them, a second abutment movable with the shaft and disks, and means for regulating communication between opposite sides of the movable abutment.

8. A door-check comprising a fluid receptacle or chamber, a shaft or trunnion having two parallel disks operating in said chamber, a fixed abutment arranged between the disks and of a thickness equal to the distance between them, a second abutment movable with the shaft and disks, a tapered pin for holding the movable abutment to the disks and means for regulating communication between opposite sides of the movable abutment.

9. The combination, with a door-check provided with an operating shaft or trunnion having a longitudinal groove, of a detachable operating-lever 51 having a spring clamping end engaging said shaft, a screw 52 in said lever end and a key 53 in said groove.

10. The combination of a casing having an oil-pot, a shaft or trunnion 6 having parallel disks 7 and 8 movable in said oil-pot, a fixed abutment in said pot between the disks, a screw passing through the casing and entering the fixed abutment, a movable abutment 16 secured to said disks and having a check-valved passage, said shaft having passages 31 and 32 extending radially and opening out toward either side of the movable abutment and also having a central bore communicating with said passages 31 and 32, and a regulating-valve 30 in said bore.

11. The combination of a casing having an oil-pot, a shaft or trunnion 6 having parallel disks 7 and 8 movable in said oil-pot, a fixed abutment in said pot between the disks, a screw passing through the casing and entering the fixed abutment, a movable abutment 16 secured to said disks and having a check-valve opening consisting of the ports and passages 24, 20, 19, 21 and 25 with two valve-seats 22, 22, and a removable ball-valve 23 adapted to coöperate with one or the other of the valve-seats, and regulated means of communication between opposite sides or faces of said movable abutment.

12. The combination, with a door-check device having an oil-pot with mechanism operating therein, of an oil-supply arranged outside of the oil-pot, and means for forming communication between the supply and the oil-pot only when said device is operated.

13. The combination, with an oil-pot, a cover therefor having a groove or recess on its under side and also means for supplying fluid from above, a shaft or trunnion passing through the cover and entering the oil-pot and a movable abutment connected to said shaft and governing communication between the recess and the pot.

14. The combination, with a fluid-chamber or oil-pot, having a fixed and a movable abutment operating therein, of a cover 5 for such chamber and provided with an annular recess 26, said movable abutment having a passage 29 communicating with said recess.

15. The combination, with a fluid-chamber or oil-pot, an operating shaft or trunnion therein, provided with a disk 7 having a port or passage 28, a cover 5 inclosing said chamber and having on its under side an annular recess 26 in communication with passage 28, a fixed and a movable abutment in said chamber below the said disk, the movable abutment having a passage 19 communicating with passage 28 and with said chamber.

16. In a door-check, fluid-pressure-controlled door-check mechanism, a suitable regulating device for regulating the speed of the equalization of the fluid-pressure, in combination with secondary means governed by the fluid-pressure for also regulating such equalization and comprising a piston having a stem acting as a valve to independently govern the said equalization.

17. In a door-check, fluid-pressure-controlled door-check mechanism having a regulating device for controlling the equalization of the fluid-pressure, in combination with automatic means governed by the fluid-pressure and independent of said device for also controlling said equalization.

18. In a door-check, the combination of a casing having a fluid-chamber, a fixed and a movable abutment therein, an operating-shaft also arranged therein and connected to the movable abutment, said shaft having a transverse passage communicating on either side of said movable abutment, and automatic means for restricting said passage in case of a forcible and sudden pressure against the door.

19. In a door-check, the combination of a casing having a fluid-chamber provided with a fixed and a movable abutment, an operating shaft or trunnion arranged therein and connected to the movable abutment, said shaft having a valve-controlled transverse passage communicating on either side of the movable abutment, and automatic means independent of said valve and operated by sudden and great pressure to further restrict said passage.

20. In a door-check, the combination of a casing having a fluid-chamber provided with a fixed and a movable abutment, an operating shaft or trunnion arranged therein and connected to the movable abutment, said shaft having a longitudinal bore connecting with a transverse passage therein which communicates on either side of the movable abutment, a movable bushing arranged in said bore and provided with holes in register with said passage, a regulating-valve in said bore to control said passage under ordinary conditions, and means for actuating said bushing under extraordinary conditions and thereby restrict said passage independently of the regulating-valve.

21. In a door-check, the combination of a casing having a fluid-chamber provided with a fixed and a movable abutment, an operating shaft or trunnion arranged therein and connected to the movable abutment, said shaft having a longitudinal bore connecting with a transverse passage therein which communicates on either side of the movable abutment, a movable bushing arranged in said bore and provided with holes in register with said passage, a regulating-valve in said bore to control said passage under ordinary conditions, and a piston for actuating said bushing.

22. In a door-check, the combination of a casing having a fluid-chamber provided with a fixed and a movable abutment, an operating shaft or trunnion arranged therein and connected to the movable abutment, said shaft having a longitudinal bore counterbored at its lower end and also having passages 31 and 32 connecting between opposite sides of the movable abutment and communicating with the bore, a movable bushing arranged in said bore and having a disk at its lower end, forming a piston working in said counterbore, said bushing having holes to register with said passages, and a regulating-valve 30 extending into said bushing to regulate the size of opening through said holes in the bushing.

23. In a door-check, the combination of a casing having a fluid-chamber provided with a fixed and a movable abutment, an operating shaft or trunnion arranged therein and connected to the movable abutment, said shaft having a longitudinal bore counterbored at its lower end and also having passages 31 and 32 connecting between opposite sides of the movable abutment and communicating with the bore, a movable bushing arranged in said bore and having a disk at its lower end, forming a piston working in said counterbore, said bushing having holes to register with said passages and a regulating-valve 30 extending into said bushing to regulate the size of opening through said holes in the bushing, and means for preventing rotary movement of the bushing.

24. In a door-check, the combination of a casing having a fluid-chamber provided with a fixed and a movable abutment, an operating shaft or trunnion arranged therein and connected to the movable abutment, said shaft having a longitudinal bore counterbored at its lower end and also having passages 31 and 32 connecting between opposite sides of the movable abutment and communicating with the bore, a movable bushing arranged in said bore and having a disk at its lower end, forming a piston working in said counterbore, said bushing having holes to register with said passages, a regulating-valve 30 extending into said bushing to regulate the size of opening through said holes in the bushing, and means for restoring the bushing to normal position.

25. In a door-check, the combination of a casing having a fluid-chamber provided with a fixed and a movable abutment, an operating shaft or trunnion arranged therein and connected to the movable abutment, said shaft having a longitudinal bore counterbored at its lower end and also having passages 31 and 32 connecting between opposite sides of the movable abutment and communicating with the bore, a movable bushing arranged in said bore and having a disk at its lower end, forming a piston working in said counterbore, said bushing having holes to register with said passages, a regulating-valve 30 extending into said bushing to regulate the size of opening through said holes in the bushing, and a spring for holding said bushing in normal position.

26. In a door-check, the combination of a casing having a fluid-chamber provided with a fixed and a movable abutment, an operating shaft or trunnion arranged therein and connected to the movable abutment, said shaft having a longitudinal bore counterbored at its lower end and also having passages 31 and 32 connecting between opposite sides of the movable abutment, and communicating with the bore, a movable bushing arranged in said bore and having a disk at its lower end, forming a piston working in said counterbore, said disk being provided with means to prevent flat seating on the bottom of the fluid-chamber, and the bushing having holes to register with said passages, and a regulating-valve 30 extending into said bushing to regulate the size of opening through said holes in the bushing.

27. In a door-check, the combination of a casing having a fluid-chamber provided with a fixed and a movable abutment, an operating shaft or trunnion arranged therein and connected to the movable abutment, said shaft having a longitudinal bore counterbored at its lower end and also having passages 31 and 32 connecting between opposite sides of the movable abutment and communicating with the bore, a movable bushing arranged in said bore and having a disk at its lower end, forming a piston working in said counterbore, said disk having a marginal bead or flange to prevent flat seating on the bottom of the fluid-chamber, and the bushing having holes to register with said passages and a regulating-valve 30 extending into said bushing to regulate the size of opening through said holes in the bushing.

28. A door-check comprising a cylindrical chamber having a fixed abutment and also a movable abutment which operates in such chamber and which is provided with two opposite sides on the radius of said chamber and an operating shaft or trunnion having a pair of parallel disks connected to said movable abutment.

29. A door-check comprising a fluid receptacle or chamber, a shaft therein having a disk resting substantially flat upon the floor of such chamber and movable thereover, a fixed abutment in said chamber, a second abutment also in said chamber and movable with said shaft and a regulated by-pass between opposite sides of said movable abutment.

30. A door-check comprising a fluid-receptacle, a shaft therein having a pair of parallel right-angled disks, both of the same cross-sectional area as the chamber and providing an extended bearing for the shaft, a fixed abutment arranged in said chamber between the disks, a second abutment secured to and arranged between such disks and a regulated by-pass between opposite sides of said movable abutment.

31. The combination of a casing having a flat-bottomed fluid receptacle or chamber 3, a cover 42 having a central opening, an actuating shaft or spindle 6 adapted to pass through said opening and having at its lower end two disks 7 and 8 extending at right angles therefrom, both disks being in operative contact with the side walls of said chamber by being of the same cross-sectional area as said chamber and the lower disk 8 resting flat on the bottom of said chamber but movable thereover whenever the said shaft is operated.

32. In a door-check, fluid-pressure-controlled door-check mechanism having a regulating device for controlling the equalization of the fluid-pressure, in combination with separate means automatically actuated upon a sudden or too-rapid movement of the door to close or further restrict such equalization.

33. In a door-check fluid-pressure-controlled door-check mechanism having a regulating device for controlling the equalization of the fluid-pressure through a passage, in combination with means arranged in said passage and actuated independently of said regulating device to close or further restrict such passage and in an automatic manner upon a sudden or too-rapid movement of the door.

SERN P. WATT.

Witnesses:
SAMUEL E. HIBBEN,
JOHN H. BERKSTRESSER.